(12) United States Patent
Fleischmann

(10) Patent No.: US 7,677,996 B2
(45) Date of Patent: Mar. 16, 2010

(54) DEVICE FOR SUPPLYING A DRIVE ELEMENT

(75) Inventor: Hans-Peter Fleischmann, Stammham (DE)

(73) Assignee: Audi AG, Ingolstadt (DE)

( * ) Notice: Subject to any disclaimer, the term of this patent is extended or adjusted under 35 U.S.C. 154(b) by 889 days.

(21) Appl. No.: 10/536,558

(22) PCT Filed: Oct. 31, 2003

(86) PCT No.: PCT/EP03/12110

§ 371 (c)(1),
(2), (4) Date: May 27, 2005

(87) PCT Pub. No.: WO2004/048815

PCT Pub. Date: Jun. 10, 2004

(65) Prior Publication Data

US 2006/0100058 A1    May 11, 2006

(30) Foreign Application Priority Data

Nov. 28, 2002    (DE) ................................. 102 55 536

(51) Int. Cl.
*F16H 37/02*    (2006.01)
*F16H 59/00*    (2006.01)

(52) U.S. Cl. ................ 474/28; 474/8; 474/16; 475/210

(58) Field of Classification Search ............ 474/8, 474/16, 18, 148, 34, 28, 23; 477/37, 45–49
See application file for complete search history.

(56) References Cited

U.S. PATENT DOCUMENTS

| 4,143,558 | A | * | 3/1979 | Van Deursen et al. ......... 474/28 |
| 4,392,394 | A | * | 7/1983 | Hofbauer et al. ............ 475/204 |
| 4,881,925 | A | * | 11/1989 | Hattori ........................ 474/18 |
| 5,292,290 | A | * | 3/1994 | Scholz et al. ............... 475/231 |
| 5,514,047 | A | * | 5/1996 | Tibbles et al. ................. 477/46 |
| 5,632,354 | A | * | 5/1997 | Kashiwase et al. .......... 180/344 |
| 6,015,359 | A | * | 1/2000 | Kunii ........................... 474/18 |
| 6,165,088 | A | * | 12/2000 | Tsubata et al. ................ 474/45 |
| 6,189,412 | B1 | * | 2/2001 | Tsubata et al. ............ 74/606 R |
| 6,379,278 | B1 | * | 4/2002 | Eguchi et al. ................. 477/34 |
| 7,288,043 | B2 | * | 10/2007 | Shioiri et al. ............... 475/210 |
| 2002/0142870 | A1 | * | 10/2002 | Okano et al. .................. 474/28 |

FOREIGN PATENT DOCUMENTS

| DE | 198 57 710 A1 | 12/1998 |
| EP | 0 760 440 A1 | 3/1997 |
| EP | 1 156 235 A2 | 11/2001 |
| JP | 59148666 | 7/1984 |

* cited by examiner

*Primary Examiner*—Bradley T King
*Assistant Examiner*—Thomas Irvin
(74) *Attorney, Agent, or Firm*—Novak Druce & Quigg LLP

(57) ABSTRACT

The invention relates to a device for supplying a hydraulic medium to a rotatably mounted drive element in a transmission case, the hydraulic medium being routed to a channel in the drive element by way of at least one channel in a coaxially adjacent element which corresponds to the drive element. Structurally favorable and reliable supply with hydraulic medium is achieved in that the drive element is nonrotatably connected to the other element and that the contact connection is at least one unthreaded conduit which is inserted tightly into the two channels and which extends directly from the element to the drive element.

6 Claims, 1 Drawing Sheet

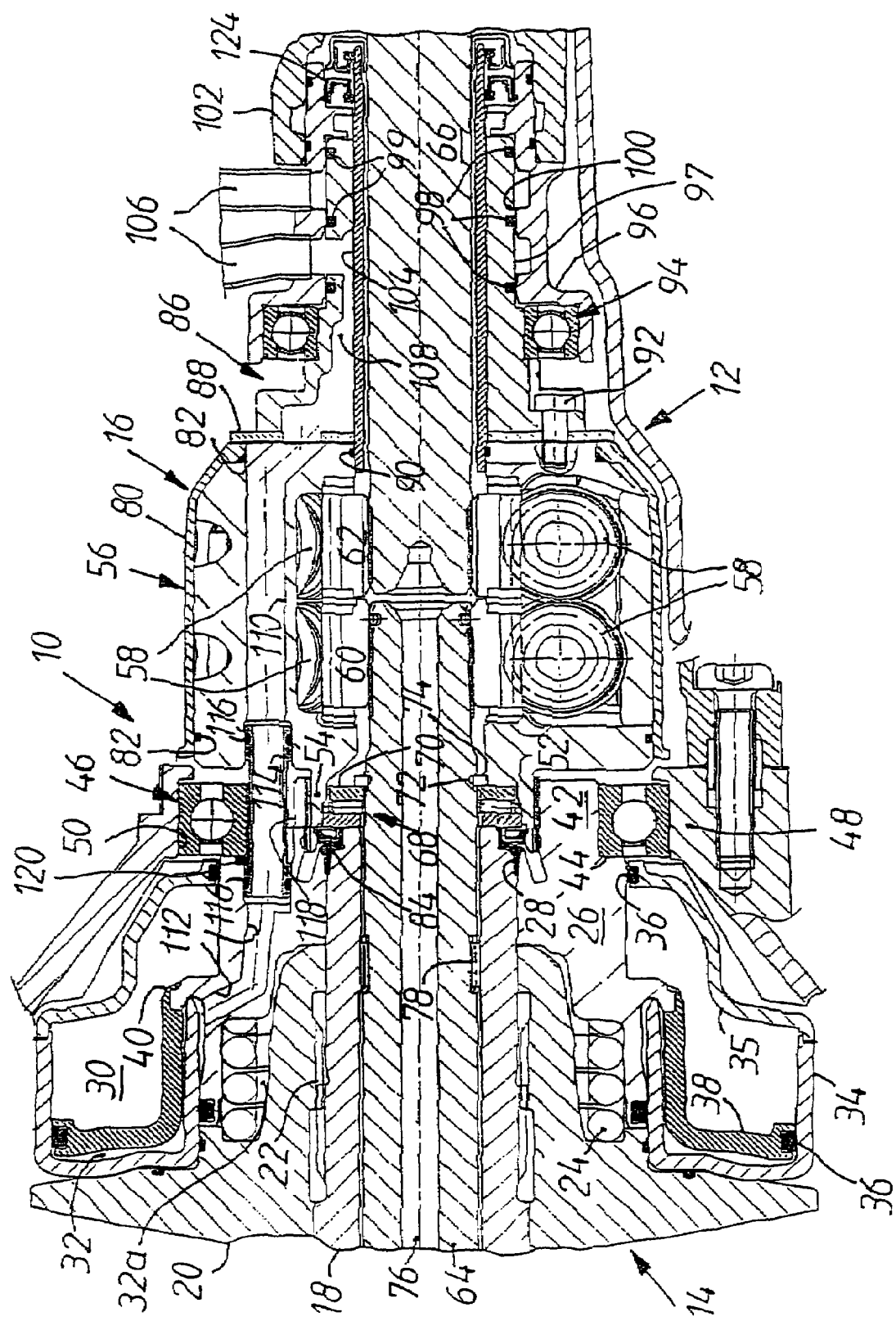

DEVICE FOR SUPPLYING A DRIVE ELEMENT

This application is a §371 application of PCT/EP03/012112, which claims priority from DE 198 57 710 A 1.

BACKGROUND

The invention relates to a device for supplying a hydraulic medium to a drive element rotatably mounted in a transmission case.

In general, drive elements rotatably mounted in a transmission case—only one example being the pulley set of continuously variable transmission in a motor vehicle, with a hydraulically adjustable loose pulley which can be axially moved relative to the fixed pulley—are transmitted by way of channels in the shaft which bears the drive element by a coaxially configured element which is connected to the hydraulic control. In particular, when several separate channels are necessary for hydraulic control, this results in a significant production engineering effort and a considerable weakening of the indicated shaft due to the required shaft bores.

The object of the invention is to propose a device of the generic type which enables reliable hydraulic supply of a drive element without shaft holes.

The drive element of the invention is nonrotatably connected to the other element and that the contact connection is at least one unthreaded conduit which is inserted tightly into the two channels and which extends directly from the element to the drive element. At least one unthreaded conduit turns with the element which supplies the hydraulic medium; shaft bores can accordingly be omitted. Furthermore, at least one unthreaded conduit forms a connection which to a limited degree allows universal movements and axial compensation between the drive element and the other element; this results in supply of the hydraulic medium to the drive element which is reliable even with unfavorable tolerance pairings and operating conditions. (temperature, load) or axial slip. Another major advantage is that if necessary the supplying element can be a component of the transmission which also performs other functions (for example, routing the hydraulic medium through a coaxially adjacent gear which turns with the drive element).

At least one unthreaded conduit can extend radially within a roller bearing which is provided between the drive element and the adjacently located element. This makes possible supply of the drive element by way of at least one unthreaded conduit even if support is indicated between the drive element and the other element for transmission engineering purposes.

Preferably the inner ring of the roller bearing can sit on the neck of the drive element and at least one unthreaded conduit can run in a corresponding recess of the neck. The unthreaded conduit can thus be partially integrated into the drive element without added construction effort and space consumption.

Simple axial locking is achieved by the unthreaded conduit being provided with a radial projection by means of which it is held on the front between the inner ring of the roller bearing and the following drive element.

Furthermore, for easy installation of the transmission element the unthreaded conduit on the two ends can bear gaskets for sealing with the adjoining channels in the drive element and the other element. This makes it possible to easily assemble the transmission elements and enables routing of the hydraulic medium which is insensitive to vibrations and which is guided hermetically sealed even in the event of limited universal and axial relative movements.

Especially preferably provision can be made for several unthreaded conduits which are distributed over the periphery of the drive element and which correspond to the appropriate channels in the drive element and in the other element. Either at the same time larger hydraulic amounts or with separate channels different hydraulic functions can be controlled by way of the unthreaded conduits.

Furthermore, the annular hydraulic chamber can be supplied using an actuating piston for movement of the drive element by way of the channels and unthreaded conduits. By using unthreaded conduits, in addition to the aforementioned advantages, channel routing within the drive element can also be simplified, because the unthreaded conduits if necessary enable direct supply of the hydraulic medium to the annular hydraulic chamber.

Advantageously there can be spline-teeth as the nonrotatable connection between the drive element and the other element; they are configured as an unthreaded connection radially within the roller bearing on the neck of the drive element and on the annular projection of the other element. This makes possible a structurally favorable and compact transmission design which moreover yields further simplification of assembly and axial tolerance compensation.

Finally, in one preferred application of the invention the drive element can be a driven pulley set of a continuously variable transmission for motor vehicles and the other element can be the differential gear case of a torsen differential, also known as a worm gear differential, the output to the axle of the motor vehicle extending through the hollow shaft of the pulley set and the transmission ratio of the pulley set to the looping means being controllable by way of channels and the unthreaded conduits. The concept of a torsen differential is known in mechanical engineering and especially in transmission engineering.

BRIEF DESCRIPTION OF THE DRAWINGS

The FIGURE shows in a longitudinal section a device for hydraulic supply of the driven pulley set of a continuously variable transmission for a motor vehicle.

DETAILED DESCRIPTION OF THE INVENTION

In the drawing, 10 generally designates a drive assembly which is rotatably mounted in an only partially shown transmission case 12 and which is composed essentially of an only partially shown driven pulley set 14 as the drive element and a torsen differential 16 which is located coaxially adjacent to it as the other element.

The pulley set 14 is one part of the continuously variable transmission for motor vehicles and interacts in the conventional manner by way of a chain or an articulated belt with a drive pulley set (not shown) located on the input shaft of the transmission.

The driven pulley set 14 has a fixed pulley (not shown in the drawings) which forms a common component with an adjoining hollow shaft 18. The fixed pulley is supported to be axially immovable in one wall of the transmission case 12 by way of a double-row taper roller bearing.

On the hollow shaft 18 the loose pulley 20 is guided to be axially movable, a spline connection which is designated as 22 producing positive locking in the peripheral direction. Here the loose pulley 20 as shown in the drawings to the left is pretensioned by means of a helical compression spring 24 which is supported on the guide section 26. The guide section 26 is connected permanently to the hollow shaft 18 by an annular laser weld at 28.

SUMMARY OF THE INVENTION

To move the loose pulley 20 relative to the fixed pulley which is not shown, between the guide section 26 and the loose pulley 20 by means of annular sheets 34, 35 which have been welded together and which are fixed on the loose pulley 20, two annular hydraulic chambers 30, 32 are formed which are sealed by gaskets which are generally designated as 36 and are divided by an annular actuating piston 38. The actuating piston 38 which is permanently connected to the guide section 26 by way of an edged connection 40 acts as the reaction element to the corresponding axial adjustment of the loose pulley 20 when the hydraulic chambers 30, 32 are pressurized accordingly.

The guide section 26 has an annular neck 42 with the inner ring 44 of the roller bearing or ball bearing 46 sitting on its outer periphery. The ball bearing 46 is held in the transmission case wall 48 in a corresponding recess 50 and thus acts as another pivot bearing for the pulley set 14.

On the inside periphery of the annular neck 42, for example in the plane of rotation of the ball bearing 46, spline-teeth designated as 52 in general are machined and interact with the corresponding spline-teeth on the sleeve-shaped projection 54 of the differential gear case 56 of the torsen differential 16 as a driving connection.

In the differential gear case 56, three worm gear pairs 58 which are distributed uniformly in the conventional manner over its periphery are supported and engage the corresponding driven gears 60, 62. The driven gears 60, 62 sit nonrotatably on driven shafts 64, 66, of which the driven shaft 64, through the hollow shaft 18 by way of a drive pinion which is not shown and a front differential, drives the front wheels of the motor vehicle, and the driven shaft 66, by way of a connected universal shaft and the rear differential, drives the rear wheels of the motor vehicle.

The drive shaft 64, in addition to the support which is not shown, is supported in the area of the drive pinion in one loading direction by way of an axial bearing 68 on the hollow shaft 18, its one retainer ring 70 being held on a locking ring 74 which is forced into an annular groove 72.

The torsen differential 16 and its operating parts are lubricated with lubricating oil from the front differential which is not shown, a feed channel 76 which is provided in the driven shaft 64 discharging into the differential gear case 56. The return of the lubricating oil takes place in the opposite direction through the hollow shaft 18, in addition to the axial bearing 68 two radially supporting needle bearings 78 (only one needle bearing 78 is shown, the second is positioned approximately in the area of the fixed pulley) between the hollow shaft 18 and the driven shaft 64 being lubricated.

The torsen differential 16 is made fully encapsulated in order to ensure only lubrication of the described operating parts with the differential lubricating oil (a hypoid oil). For this purpose, there is an annular cover part 80 which encloses the differential gear case 56 and which seals the differential gear case 56 to the outside in conjunction with gaskets 82. Another gasket 84 is inserted in the area of the spline-teeth 52 between the hollow shaft 18 and the sleeve-shaped projection 54 of the differential gear case 56.

The front seal of the differential gear case 56 finally effects a tubular piston ring insert 86 with a connecting flange 88 with another gasket 56 which it is screwed (screws 92) tightly to the differential gear case 56 and the axial seal (not shown).

The piston ring 86 and accordingly the differential gear case 56 are pivotally mounted directly following the connecting flange 88 by means of another roller bearing or ball bearing 94 in a corresponding receiver 96 on the housing, the annular section 97 of the piston ring insert 86 which is provided with piston rings 98 in the corresponding outside grooves 99 projecting, as is apparent, into a cylindrical hole 100 of the housing part 102 which has the receiver 96.

The rotationally symmetrical sealing sleeve 104 which is inserted into the piston ring insert 86 projects axially over the annular section 97 and is sealed to the housing part 102 by way of a rotary shaft seal 124 so that hydraulic medium cannot emerge from the channels 106, 108.

The hydraulic chambers 30, 32, 32a can be supplied on alternating sides with a pressurized hydraulic medium for control of the driving transmission of the continuously variable transmission by way of the piston ring insert 86 and the rotationally symmetrical sealing sleeve 104 which is inserted into it, by way of the illustrated channels 106 which are each provided with a uniform reference number in the housing part 102, by way of the channels 108 which are formed by the longitudinal grooves in the piston ring insert 86, by way of the channels 110 which are machined in the differential gear case 56, and finally by way of the corresponding channels 112 in the guide section 26 (only one channel 112 is shown in the sectional view of the drawing).

The hydraulic connection between the channels 110 in the differential gear case 56 and the channels 112 in the guide section 26 is formed by three unthreaded conduits 114. The unthreaded conduits 114 each project with the interposition of gaskets 116 on the one hand into a corresponding front recess of the guide section 26 and of the differential gear case 56, said unthreaded conduits being guided through recesses 118 of the guide section 26, which are open radially to the outside and which are semicircular when viewed in cross section, within the inner ring 44 of the ball bearing 46.

The unthreaded conduits 114 (to move the loose pulley, as stated, there are three unthreaded conduits 114 which are distributed uniformly over the periphery of the guide section 26 and of the differential gear case 56) are held by means of radial projections 120 which are molded onto them between the inner ring 44 and the front recess 122 of the guide section 26. Axial guidance of the unthreaded conduit can also be selectively guaranteed by contact of the end surfaces.

The invention claimed is:

1. A transmission comprising:
   a housing;
   a bearing mounted in said housing;
   a differential gear provided with a case having at least one longitudinally disposed fluid passageway, disposed in said case;
   a pair of axially aligned driven shafts disposed coaxially with said bearing, drivingly connected to said differential gear disposed therebetween;
   a hollow drive shaft receiving one of said driven shafts therein, provided with a fixed pulley and an axially displaceable pulley thereon;
   a guide member affixed to said drive shaft, journaled in said bearing and drivingly connected to said differential gear case, provided with means including an expandable chamber for displacing said displaceable pulley, and at least one fluid passageway communicating with said chamber; and
   a conduit inserted in openings in said guide member and said differential gear case, intercommunicating said passageways therein, wherein said conduit extends through the inner opening of said bearing.

2. A transmission according to claim 1 wherein said conduit is disposed adjacent an inner race of said bearing.

3. A transmission according to claim 1 wherein said conduit includes an annular flange interposed between said guide member and an inner race of said bearing functional to preclude longitudinal displacement thereof.

4. A transmission according to claim 1 including an annular seal between said conduit and said differential gear case.

5. A transmission according to claim 1 wherein said driving connection between said guide member and said differential gear case comprises a splined connection.

6. A transmission according to claim 1 wherein said differential gear comprises a worm gear differential gear, said driven shafts are drivingly connectable to wheels of a motor vehicle and the transmission ratio is controlled by the supply of a fluid to said chamber through said passageways and said conduit.

* * * * *